(12) United States Patent
Drewry et al.

(10) Patent No.: US 9,152,798 B1
(45) Date of Patent: Oct. 6, 2015

(54) SECURELY ENABLING CONTENT PROTECTION ACROSS A SANDBOXED APPLICATION BOUNDARY

(71) Applicant: Google Inc., Mountain View, CA (US)

(72) Inventors: William Alexander Drewry, Nashville, TN (US); David Kimbal Dorwin, Kirkland, WA (US)

(73) Assignee: Google Inc., Mountain View, CA (US)

( * ) Notice: Subject to any disclaimer, the term of this patent is extended or adjusted under 35 U.S.C. 154(b) by 46 days.

(21) Appl. No.: 13/758,347

(22) Filed: Feb. 4, 2013

(51) Int. Cl.
G06F 21/00 (2013.01)
G06F 21/60 (2013.01)

(52) U.S. Cl.
CPC .................. *G06F 21/60* (2013.01)

(58) Field of Classification Search
USPC ........................................................ 726/27
See application file for complete search history.

(56) References Cited

U.S. PATENT DOCUMENTS

| | | | |
|---|---|---|---|
| 2009/0165148 A1* | 6/2009 | Frey et al. | 726/30 |
| 2012/0189117 A1* | 7/2012 | Devanand et al. | 380/28 |
| 2012/0303951 A1* | 11/2012 | Medvinsky et al. | 713/157 |
| 2013/0055335 A1* | 2/2013 | Chien | 726/1 |
| 2013/0152180 A1* | 6/2013 | Nair et al. | 726/6 |
| 2013/0174271 A1* | 7/2013 | Handal et al. | 726/27 |
| 2013/0205133 A1* | 8/2013 | Hess | 713/155 |

OTHER PUBLICATIONS

Andrade et al, Using Context to Assist the Adaptation of Protected Multimedia Content in Virtual Collaboration, 2007, IEEEpp. 233-242.*
Moshchuk et al, Content-Based Isolation: Rethinking Isolation Policy, Design on Client Systems, 2012, ACM digital library, pp. 1-14.*
Chen et al, Content Identification in Consumer Applications, 2009, IEEE, pp. 1536-1539.*
"Using Output Protection Manager", Microsoft, retrieved on Sep. 26, 2012 from msdn.microsoft.com/en-us/library/windows/desktop/dd389296.aspx#InitializingOPMSession, 6 pages.
"OPM Example Code", Microsoft, retrieved on Sep. 26, 2012 from msdn.microsoft.com/en-us/library/windows/desktop/dd388945.aspx, 16 pages.
"Protected Media Path", Microsoft, retrieved on Sep. 26, 2012 from msdn.microsoft.com/en-us/library/windows/desktop/aa376846(v=vs.85).aspx, 5 pages.

* cited by examiner

*Primary Examiner* — Luu Pham
*Assistant Examiner* — Ali Shayanfar
(74) *Attorney, Agent, or Firm* — Brake Hughes Bellermann LLP

(57) ABSTRACT

A sandboxed application issues a request to enable content protection for audio and video content. The request is sent via an application programming interface to an unsandboxed application. The request is received from the unsandboxed application by an output device. After receiving the request, content protection is enabled and the output device employs a certificate to create a signed message indicating the content protection is enabled. The sandboxed application verifies the request has been fulfilled based on the signed message, and provides protected audio and video content.

19 Claims, 5 Drawing Sheets

US 9,152,798 B1

SECURELY ENABLING CONTENT PROTECTION ACROSS A SANDBOXED APPLICATION BOUNDARY

TECHNICAL FIELD

This description generally relates to content protection for audio and video content.

BACKGROUND

Digital rights management (DRM) schemes attempt to prevent any use of digital content that is not desired or intended by the content provider. For example, High-bandwidth Digital Content Protection (HDCP) is meant to stop HDCP-encrypted content from being played on devices that do not support HDCP, or on devices that have been modified to copy HDCP content. Before sending data, a transmitting device checks that the receiver is authorized to receive it. If so, the transmitter encrypts the data to prevent eavesdropping as it flows to the receiver.

DRM schemes may, however, be intrusive and touch many parts of a system. For example, many DRM schemes run with full (e.g., admin and root) access to a user's system, which can result in reduced security and privacy.

With "sandboxed" applications such as web browsers, a limited (i.e., sandboxed) "DRM" code may want to use content protection such as HDCP or a secure media path, for example to prevent copying of digital audio and video content as it travels across connections. Sandboxes, however, generally do not provide access to HDCP or secure media paths, and even if they did, the sandboxed "DRM" code would not be able to tell whether the other side of the sandbox is doing what is requested. Nor would it be able to determine if the environment outside the sandbox is trusted. Thus, an attacker could easily drop such requests, lie about the state, or intercept calls or data.

Accordingly, there exists a need for systems and methods to address the shortfalls of present technology and to provide other new and innovative features.

SUMMARY

According to one general aspect, a method includes issuing, by a sandboxed application, a request to enable content protection for audio and video content; sending the request via an application programming interface to an unsandboxed application; receiving, from the unsandboxed application, the request by an output device; after receiving the request, enabling content protection; employing, by the output device, a certificate to create a signed message indicating the content protection is enabled; verifying, by the sandboxed application, that the request has been fulfilled based on the signed message; providing, by the sandboxed application, protected audio and video content; and outputting the protected audio and video content.

According to another general aspect, a system includes a memory configured to store executable code; a processor operably coupled to the memory and configured to execute the executable code to operate: a sandboxed application configured to: issue a request to access a secure media path for content protection for audio and video content by sending the request via an application programming interface to an unsandboxed application, and verify that the request has been fulfilled. The secure media path is configured to receive the request, and after receiving the request, employ a certificate and a public key to create a signed message indicating the secure media path is authentic.

In some implementations, after the sandboxed application verifies that the request has been fulfilled, the sandboxed application utilizes the public key to encrypt a content key before passing it outside the sandboxed application to the secure media path.

According to another general aspect, a method includes issuing, by a sandboxed application, a request to enable high-bandwidth digital content protection for audio and video content, wherein the sandboxed application lacks direct access to an output device; sending the request via an application programming interface to an unsandboxed application that has direct access to the output device; verifying that the request has been fulfilled; and after verifying that the request has been fulfilled, provided protected audio and video content to the output device.

One or more of the implementations of the subject matter described herein can be implemented so as to realize one or more of the following advantages: enable sandboxed applications to use content protection such as HDCP, check the status of content protection, or use a secure media path across a sandboxed application boundary.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Systems and methods described here securely enable content protection, such as HDCP or a secure media path, across a sandboxed application boundary.

Figure 1:
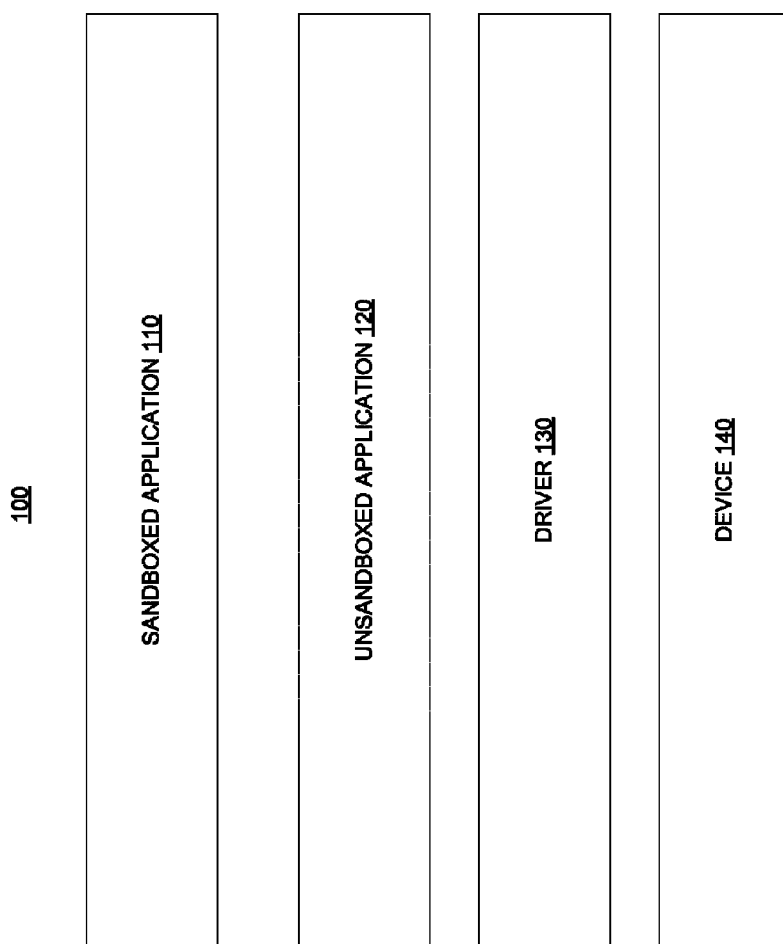
FIG. 1 is a block diagram of a system with a sandboxed application, in accordance with systems and methods described here.

FIG. 1 is a block diagram of a system with a sandboxed application, in accordance with systems and methods described here.

As shown in FIG. 1, a system 100 may include a sandboxed application 110, an unsandboxed application 120, a device driver 130, and a device 140. A sandboxed application 110 may be any application that lacks direct access to driver 130 or device 140, such as a sandboxed web browser application tab. Unsandboxed application 120 may represent any application with direct access to driver 130 or device 140. In some implementations, unsandboxed application 120 may represent, for example, a web browser window. Sandboxed application 110 and unsandboxed application 120 may communicate with each other by passing messages, for example, as discussed in more detail below with respect to FIG. 2. Sandboxed application 110 may, in some implementations, control the lifecycle of unsandboxed application 120. For example, a sandboxed web browser tab may be able to terminate a browser window process at any time, for example if an error occurs.

Driver 130 may represent any device driver that can communicate directly with unsandboxed application 120, and with device 140. In some implementations, driver 130 may provide communications (e.g., messages, data, requests, etc.) from unsandboxed application 120 to device 140, and from device 140 to unsandboxed application 120. Device 140 may represent, for example, an output device, video card, sound card, Trusted Platform Module (TPM) device, secure cryptoprocessor, or other hardware.

Figure 2:
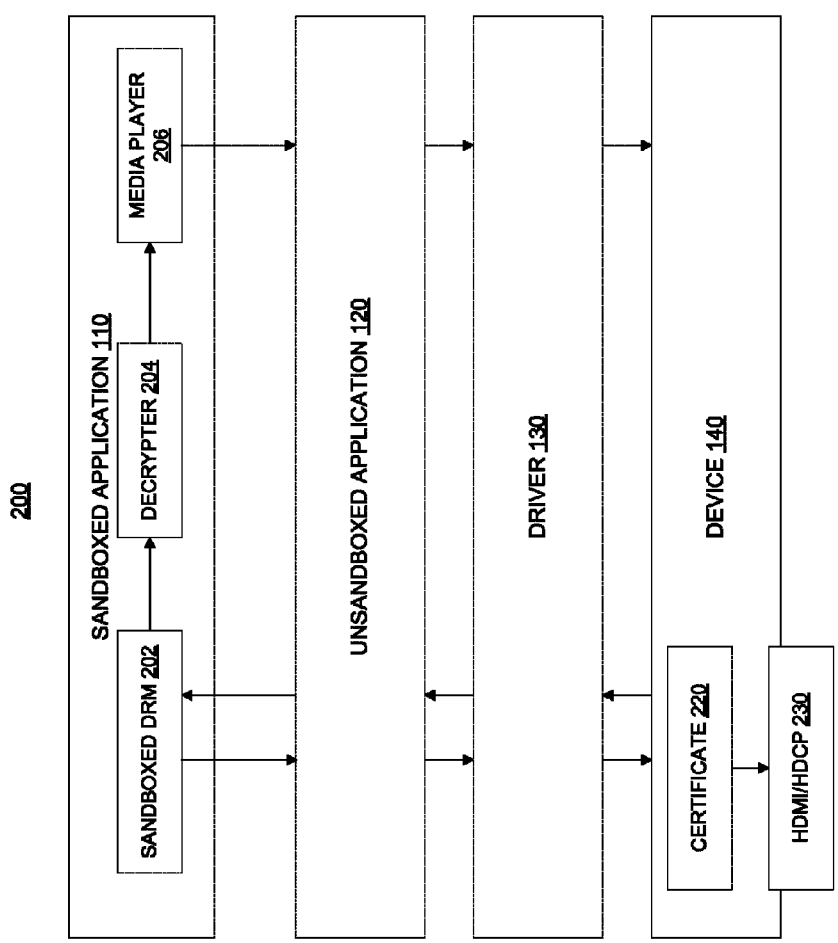
FIG. 2 is a block diagram of a system that provides content protection across a sandboxed application boundary, in accordance with systems and methods described here.

FIG. 2 is a block diagram of a system that provides content protection across a sandboxed application boundary, in accordance with systems and methods described here. As shown in FIG. 2, a system 200 may include a sandboxed application 110, an unsandboxed application 120, a device driver 130, and a device 140. Sandboxed application 110 may also include Sandboxed DRM 202, decrypter 204, and media player 206. Sandboxed DRM 202 may represent code that may want to use content protection such as High-bandwidth Digital Content Protection (HDCP) or a secure media path, for example to prevent copying of digital audio and video content as it travels across connections. As mentioned above, sandboxed application 110 does not provide direct access to HDCP or secure media paths, and even if it did, the sandboxed DRM 202 would not be able to tell whether the other side of the sandbox is doing what is requested.

Application programming interface(s) (API(s)) may enable content protection such as HDCP and may allow sandboxed application 110 to check the status of content protection, or use a secure media path. Certificates or keys may be utilized in the driver 130 or hardware device 140 of a system 200 to sign challenges from a sandboxed application 110, to otherwise attest that the operations requested by the API call(s) have been performed, or to verify that the result of a query is genuine.

As long as a sandboxed application 110 can trust that the certificates or keys (and whatever contains them) have not been compromised, the sandboxed DRM 202 does not need to verify an environment outside the sandbox. The entity holding the certificates or keys (e.g., device 140) may also verify certain states or environment (i.e., to ensure the content protection has not been tampered with). The combination of sandboxing, the API, and the attestation across the API and sandbox boundary provide increased security and privacy while allowing for DRM code to use HDCP.

In one implementation, a computing device's hardware or driver 130 has a key (e.g., a private key) or certificate 220. The sandboxed DRM 202 issues a challenge or request (i.e., with a nonce value) across the API, which is received by an unsandboxed application 120. The unsandboxed application 120 passes the request to the driver 130 and/or device 140, which enables content protection (e.g., HDMI or HDCP 23) if it is not already enabled, and uses its private key or certificate 220 to sign a message indicating that content protection is or has been enabled.

In some implementations, the sandboxed application 110 may periodically check that content protection is enabled. The sandboxed application may automatically perform such a periodic check by enabling content protection, as described above, and by sending another request via an API call(s) to unsandboxed application 120 to check that the content protection is enabled, for example.

Decrypter 204 may receive a key from sandboxed DRM 202 to decrypt data for output (e.g., audio and/or video). Decrypter 204 may then pass the decrypted data to media player 206. Media player 206 may in turn send the decrypted data (which may be, for example, protected audio content), to unsandboxed application 120, which in turn may send the output to driver 130. Driver 130 sends the output to device 140, which may output the protected content (e.g., audio and/or video).

In some implementations, the device 140 or driver 130 may provide a secure duration of time since the content protection was enabled, or a timestamp of when the content protection was enabled. The secure duration of time or timestamp may provide the system with an advantage of, for example, preventing an attack where the unsandboxed code only enables the content protection when it is asked to verify that it is enabled then disables it.

The systems and techniques described here may be used with the hardware, platform, or operating system (OS) of a computing device to determine the output devices that are connected and to ensure they are not in use or have content protection enabled. For example, the OS may attest to the devices present and may provide a signature, certificate, challenge, or the like that can be used to verify it is the one the sandboxed DRM 202 is communicating with. Requests may then be issued to enable output protection on all output devices (or some output devices, such as ones that have been designated as important) or to verify that no output is connected. In some implementations, the sandboxed DRM 202 may periodically query the devices, or may securely disable them for some period of time (e.g. a predetermined period of time).

In another embodiment, the hardware, driver 130, platform, or OS may issue callbacks when an output device is connected or output protection is disabled, and may request a secure response from the code that made the original request. This may be accomplished by providing a public key from the sandboxed DRM 202 at the time it initiates this process. In such an example, the platform may then enable new connections or the disabling of output protection once it received a response signed by the public key matching the public one.

On integrated devices, a content protection state may be tied into a TPM such that the TPM's certificates can be used to attest to the state of the content protection. On desktops, discrete output devices may exist that may implement the output protection. On integrated devices, the outputs may all be integrated such that the TPM can verify the output protection.

Secure media paths may keep a data stream (e.g., audio or video) encrypted until it is passed on to an authenticated driver (e.g., an authenticated sound card or authenticated video card). Secure media paths in combination with the systems and methods described here may use a similar technique as described above with respect to FIG. 2. Instead of verifying the output protection messages are being used and provided by a trusted entity, however, the secure media path may attest to its authenticity and trustworthiness, so, for example, the sandboxed code will trust its public key. As an example, the public key may be signed by a certificate that can be verified using public-key infrastructure (PKI).

In another embodiment, a whitelisted set of keys may be known or provided to the sandboxed DRM 202. In yet another embodiment, the sandboxed DRM 202 may send the public key to a server (not shown) to be verified. In other embodiments, all of the verification, such as signature, nonce, etc., may be done on a remote server.

In yet another embodiment, once the public key is trusted, the sandboxed DRM 202 may use the public key to encrypt a content key (for example from a DRM-specific license) before passing it outside the sandboxed application 110 to be provided to the secure media path so that it can use it to decrypt media stream(s).

If an environment is not "trusted," an attacker could patch or otherwise tamper with the sandboxed DRM 202 (or other) code in the sandboxed application 110. Mitigations to such tampering (i.e. obfuscation) may be used along with the systems described here.

Still further alternative or additional implementations are possible. For example, trusted code outside the plugin may be used by embedding a key or certificate that can be used to attest to the sandboxed DRM 202. Another implementation may provide secure proof that a content protection module is present or even that an instance of a software controller has been created.

Figure 3:
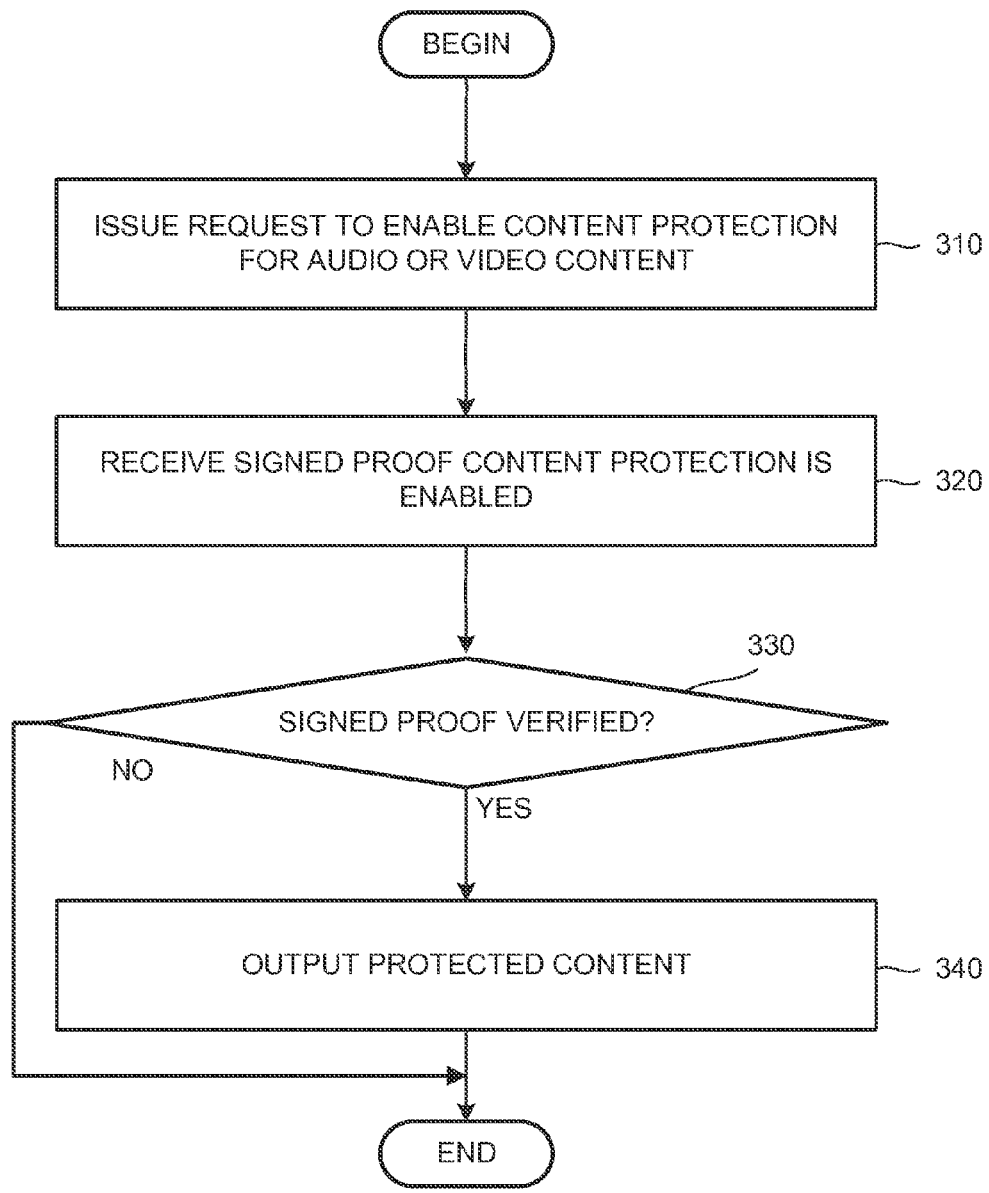
FIG. 3 is a flow diagram showing an example implementation of a sandboxed application that provides content protection, in accordance with systems and methods described here.

FIG. 3 is a flow diagram showing an example implementation of a sandboxed application that provides content protection, in accordance with systems and methods described here. Process 300 as shown in FIG. 3 may be performed at least in part by sandboxed application 110 described above with respect to FIGS. 1 and 2. As shown in FIG. 3, the sandboxed application 110 may issue a request to enable content protection for audio or video content (310). Such a request may be issued via an API call to an unsandboxed application, which may in turn pass the request to a driver or hardware device, as illustrated in FIG. 2. Turning back to FIG. 3, the sandboxed application 110 may receive signed proof that content protection is enabled (320), for example from a hardware device via communication with a driver and an unsandboxed application. The signed proof may include a message signed with a certificate or private key, for example. The sandboxed application 110 may verify the signed proof (330). If the signed proof is verified (330, yes), the sandboxed application may output protected content (340), for example by providing protected content (e.g., audio or video) to an output device. If the signed proof is not verified (330, no), then the protected content may not be output, and the sandboxed application may, in some implementations, issue another request to enable content protection.

Figure 4:
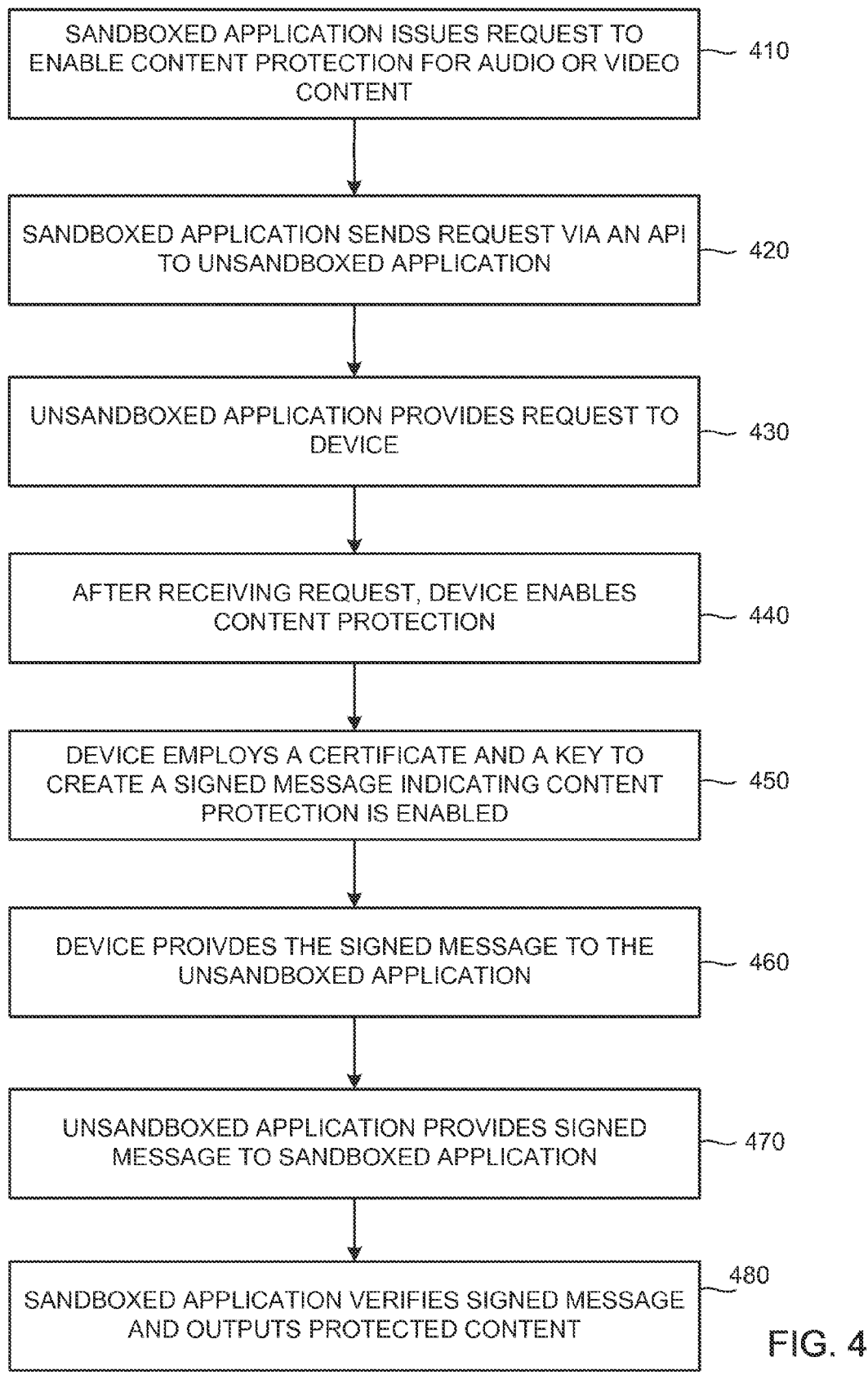
FIG. 4 is a flow diagram showing an example implementation of a system that provides content protection across a sandboxed application boundary, in accordance with systems and methods described here.

FIG. 4 is a flow diagram showing an example implementation of a system that provides content protection across a sandboxed application boundary, in accordance with systems and methods described here. Process 400 as shown in FIG. 4 may be performed at least in part by system 200 described above with respect to FIG. 2. As shown in FIG. 4, a sandboxed application may issue a request to enable content protection for audio or video content (410). The sandboxed application may send the request via an API call to an unsandboxed application (420). The unsandboxed application provides the request to a device (430), for example via a driver 130 shown in FIG. 2. After receiving the request, the device enables content protect (440) if such content protection is not already enabled. Content protection may include, for example, HDMI or HDCP. The device may employ a certificate or a key to create a signed message indicating that content protection is enabled (450). The device provides the signed message to the unsandboxed application (460), for example via driver 130 shown in FIG. 2. The unsandboxed application provides the signed message to the sandboxed application (470). The sandboxed application may verify the signed message and outputs protected content (480). In some implementations, such verification may be performed within the sandboxed application 110, or may include the use of a remote server. A media player, as shown in FIG. 2, for example, may provide the protected content to the device for output.

Figure 5:
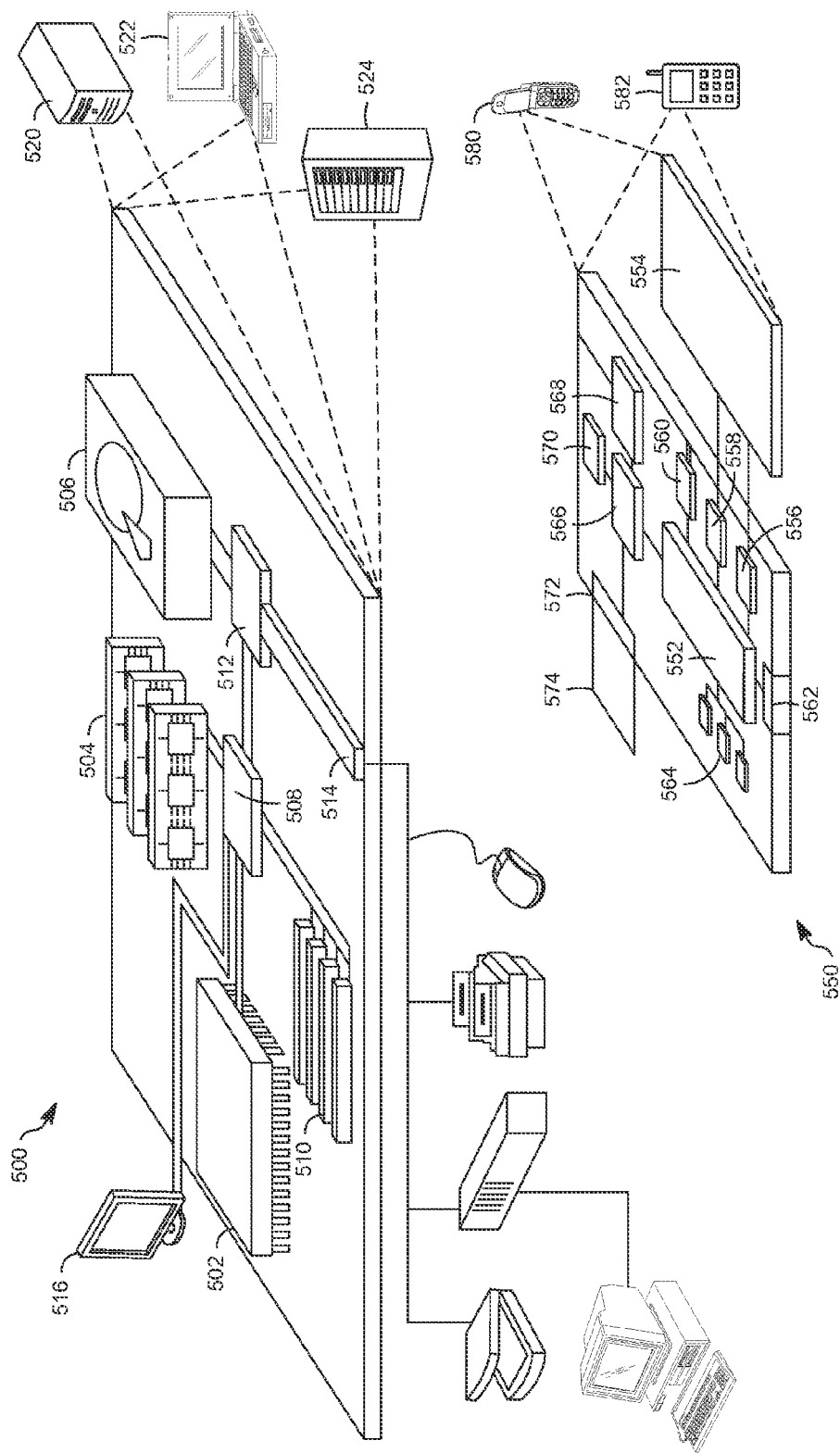
FIG. 5 is a block diagram showing example or representative computing devices and associated elements that may be used to implement systems and methods described here.

FIG. 5 is a block diagram showing example or representative computing devices and associated elements that may be used to implement systems and methods described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, BLUETOOTH, ETHERNET, wireless ETHERNET) may be coupled to one or more input/output devices, such as a keyboard, a pointing device, a scanner, or a networking device such as a switch or router, e.g., through a network adapter.

The computing device 500 may be implemented in a number of different forms, as shown in FIG. 5. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, which may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a BLUETOOTH, Wi-Fi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in FIG. 5. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   issuing, by a sandboxed application, a request to enable content protection for audio and video content;
   sending the request via an application programming interface to an unsandboxed application;
   receiving, from the unsandboxed application, the request by an output device;
   after receiving the request, enabling content protection;
   employing, by the output device, a certificate to create a signed message indicating the content protection is enabled;
   providing, by the unsandboxed application, the signed message to the sandboxed application;
   verifying, by the sandboxed application, that the signed message is from a trusted entity;
   verifying, by the sandboxed application, that the trusted entity performed the request;
   verifying, by the sandboxed application, that the request has been fulfilled based on the signed message;
   providing, by the sandboxed application, protected audio and video content; and
   outputting the protected audio and video content.

2. The method of claim 1, further comprising:
   including a nonce value with the request.

3. The method of claim 1, further comprising:
   providing, within the sandboxed application, decrypted data to a media player.

4. The method of claim 3, further comprising:
   providing, by the media player, the protected audio and video content to the output device via the unsandboxed application.

5. The method of claim 1, further comprising:
   communicating with a server to verify the signed message.

6. The method of claim 1, further comprising:
   periodically checking, by the sandboxed application, that content protection is enabled.

7. The method of claim 1, further comprising:
   providing, by the output device, a timestamp of when the content protection was enabled.

8. The method of claim 1, further comprising:
   providing, by the output device, a secure duration of time since the content protection was enabled.

9. The method of claim 1, further comprising:
   providing, by a device driver, the signed message from the output device to the unsandboxed application.

10. The method of claim 9, further comprising:
    receiving, by the device driver, the request from the unsandboxed application; and
    providing, by the device driver, the output device with the request.

11. The method of claim 1, wherein the sandboxed application lacks direct access to the output device.

12. The method of claim 1, wherein the sandboxed application is a tab of a web browser application.

13. The method of claim 12, wherein the unsandboxed application is a window of the web browser application that has direct access to the output device or to a device driver.

14. The method of claim 1, wherein the output device is a video card.

15. The method of claim 1, further comprising:
    securely disabling, by the sandboxed application, the output device for a predetermined period of time.

16. A system comprising:
    a memory configured to store executable code;
    a processor operably coupled to the memory and configured to execute the executable code to operate:
    a sandboxed application configured to:
      issue a request to access a secure media path for content protection for audio and video content by sending the request via an application programming interface to an unsandboxed application,
      receive, from the unsandboxed application, the signed message;
      verify that the signed message is from a trusted entity;
      verify that the trusted entity performed the request;
      verify that the request has been fulfilled; and
      the secure media path being configured to receive the request, and after receiving the request, employ a certificate and a public key to create a signed message indicating the secure media path is authentic.

17. The system of claim 16, wherein the sandboxed application is configured to, after the sandboxed application verifies that the request has been fulfilled, utilize the public key to encrypt a content key before passing it outside the sandboxed application to the secure media path.

18. The system of claim 16, wherein the sandboxed application is a tab of a web browser application.

19. The system of claim 18, wherein the unsandboxed application is a window of the web browser application that has direct access to the output device or to a device driver.

\* \* \* \* \*